US009902057B1

(12) United States Patent
Sherrod, Jr.

(10) Patent No.: US 9,902,057 B1
(45) Date of Patent: Feb. 27, 2018

(54) TOOL FOR HYDRAULIC CYLINDERS

(71) Applicant: Benjamin Sherrod, Jr., South Plainfield, NJ (US)

(72) Inventor: Benjamin Sherrod, Jr., South Plainfield, NJ (US)

( * ) Notice: Subject to any disclaimer, the term of this patent is extended or adjusted under 35 U.S.C. 154(b) by 0 days.

(21) Appl. No.: 15/467,206

(22) Filed: Mar. 23, 2017

Related U.S. Application Data

(60) Provisional application No. 62/312,006, filed on Mar. 23, 2016.

(51) Int. Cl.
*B25J 1/04* (2006.01)

(52) U.S. Cl.
CPC .................................... *B25J 1/04* (2013.01)

(58) Field of Classification Search
CPC .. B25J 1/04; A47F 13/06; B25B 13/02; B25B 13/08; B25B 13/5033
USPC ............... 294/15, 92, 209; 269/287; 43/21.2
See application file for complete search history.

(56) References Cited

U.S. PATENT DOCUMENTS 1,261,164 A 4/1918 Quinlan
1,733,642 A 10/1929 Beduorz
2,631,470 A 3/1953 Sandberg
2,693,935 A * 11/1954 Halbert .................... B65G 7/12 254/131
2,697,000 A * 12/1954 Giffin ....................... B65G 7/12 294/15
3,648,540 A 3/1972 King
3,722,316 A 3/1973 Hawkins et al.
5,024,476 A * 6/1991 Massey ..................... B25B 7/00 254/94
5,769,474 A * 6/1998 Moore ....................... B25J 1/04 116/173
5,791,704 A * 8/1998 Thompson ............... B65G 7/12 294/17
5,896,639 A 4/1999 Chen
6,601,887 B2 * 8/2003 Graves .................. A01B 1/026 294/58
7,770,277 B2 8/2010 Wridt
2013/0200315 A1 8/2013 Chestnut, Jr.

* cited by examiner

*Primary Examiner* — Dean J Kramer

(74) *Attorney, Agent, or Firm* — Robert C. Montgomery; Montgomery Patent & Design, LP.

(57) ABSTRACT

A tool which permits a user to safely manipulate and position a hydraulic cylinder during installation upon an industrial machine such as a backhoe or a skid steer. The tool provides an extended handle portion which allows a user to maintain control of the hydraulic cylinder while at a safe distance.

3 Claims, 3 Drawing Sheets

TOOL FOR HYDRAULIC CYLINDERS

RELATED APPLICATIONS

This application claims the benefit of U.S. Provisional Application No. 62/312,006 which was filed Mar. 23, 2016, the entire disclosures of which are incorporated herein by reference.

FIELD OF THE INVENTION

The present invention relates generally to the field of tools to hold cylinders for installation and more specifically relates to tool for small hydraulic cylinder systems.

BACKGROUND OF THE INVENTION

A hydraulic cylinder is a mechanical actuator that is used to give a unidirectional force through a unidirectional stroke. Use of a hydraulic cylinder has many applications, including in construction equipment, manufacturing machinery, and civil engineering. Hydraulic cylinders get their power from pressurized hydraulic fluid, which is typically of an oil-based composition. A hydraulic cylinder consists of a cylinder barrel, in which a piston connected to a piston rod moves back and forth. The barrel is closed on one (1) end by the cylinder bottom, or cap, and the other end is enclosed by a cylinder head where the piston rod exits out of the cylinder. The piston rod has sliding rings and seals. The piston rod and sliding rings and seals assembly divides the inside of the cylinder into two (2) chambers, the bottom chamber or cap end and the piston rod side chamber. The piston rod also has mounting attachments to connect the cylinder to the object or machine component that it is pushing and pulling. A hydraulic cylinder is the actuator or "motor" side of this system. The 'generator" side of the hydraulic system is often a hydraulic pump, which allows a regulated flow of oil to the hydraulic cylinder, thus moving the piston pushing the oil in the second chamber back to the reservoir.

When installing or replacing a hydraulic cylinder, proper alignment before and during installation into the receiving equipment is required to ensure the hydraulic cylinder remains structurally sound. If not, the hydraulic cylinder will fail and need additional replacement. A suitable solution is desired.

Various attempts have been made to solve problems found in tools to hold cylinders for installation art. Among these are found in: U.S. Pat. Nos. and U.S. Pat. App. Pub. Nos. 2005/0051441 to Lamar; U.S. Pat. No. 4,763,395 to Fontaine; U.S. Pat. No. 4,190,240 to Peterson; U.S. Pat. No. 4,444,425 to Miller, et. al.; and U.S. Pat. No. 3,363,929 to Marvin. These prior art references are representative of tools to hold cylinders for installation.

None of the above inventions and patents, taken either singly or in combination, is seen to describe the invention as claimed. Thus, a need exists for a reliable tool for small hydraulic cylinder system, and to avoid the above-mentioned problems.

SUMMARY OF THE INVENTION

The principles of the present invention provide for a cylinder installation tool, comprising a first tube length which has a first tube length first end and a first tube length second end, a mid-section which has a mid-section first end and a mid-section second end, wherein the first tube length second end is secured to the mid-section first end, a base which has a base first end and a base second end, wherein the base first end is secured to the mid-section second end at an exterior side of the base first end and a cross-brace which has a cross-brace first end and a cross base second end. The cross-brace first end is secured to a midpoint of an exterior first side of the mid-section and the cross-brace second end is secured to a midpoint of the exterior side of the base between the base first end and the base second end.

The base comprises a half tubular shape having an interior side configured to engage an exterior surface of a hydraulic cylinder. When a first force is applied to the first tube length the first force is transmitted to an exterior surface of the hydraulic cylinder when the hydraulic cylinder is fit about by the base thereby permitting manipulation of the hydraulic cylinder. In a different embodiment, the tool may also have an eyelet which is secured to a second side of the mid-section between the cross-brace and below the mid-section first end.

The first tube length may be secured to the mid-section at a forty-five-degree angle parallel to and away from the base and may be welded to the mid-section. The cross-brace is secured to the mid-section and the base at respective forty-five-degree angles and may be welded to the mid-section and to the base.

The first tube length may further comprise of a first shoulder disposed adjacent the first tube length first end and a second shoulder disposed adjacent the first tube length second end. The first tube length may further comprise a grip disposed between the first shoulder and the second shoulder. The grip may comprise rubber. The base may also comprise a rubber sleeve nesting and contiguous within the interior side of the base.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
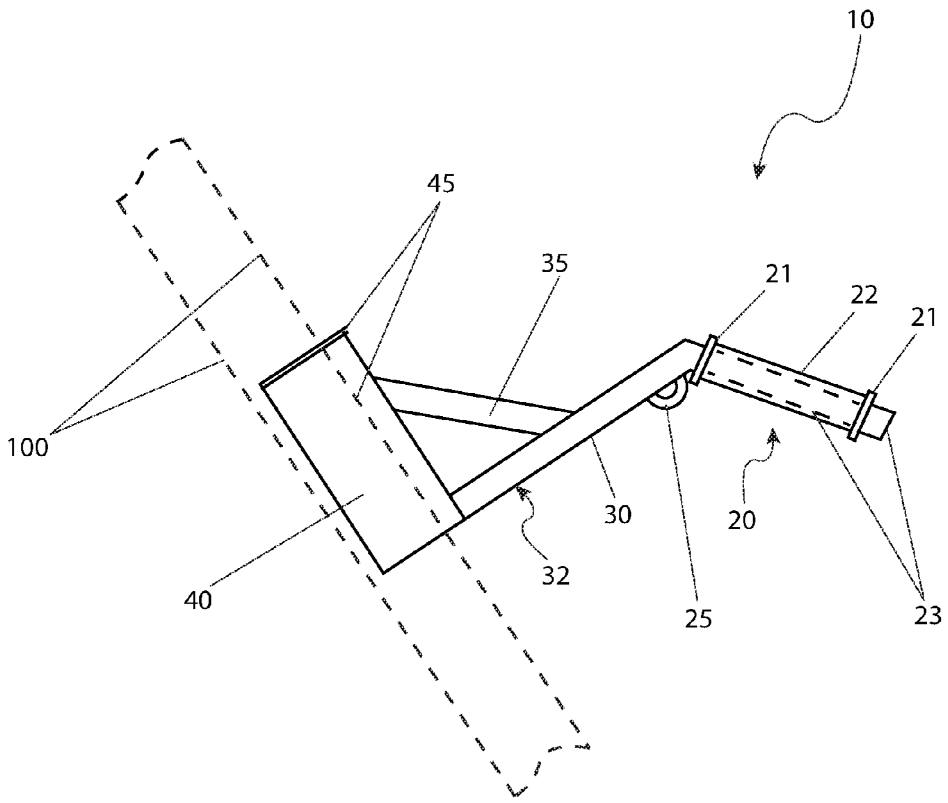
FIG. 1 is a side elevation view of a cylinder installation tool 10 depicting an in-use state, according to an embodiment of the present invention.

10 cylinder installation tool
20 upper-section
21 shoulder
22 grip
23 first tube length
25 eyelet
30 mid-section
32 second tube length
35 cross brace
40 base
45 sleeve
100 hydraulic cylinder

DETAILED DESCRIPTION OF THE PREFERRED EMBODIMENT

Figure 2:
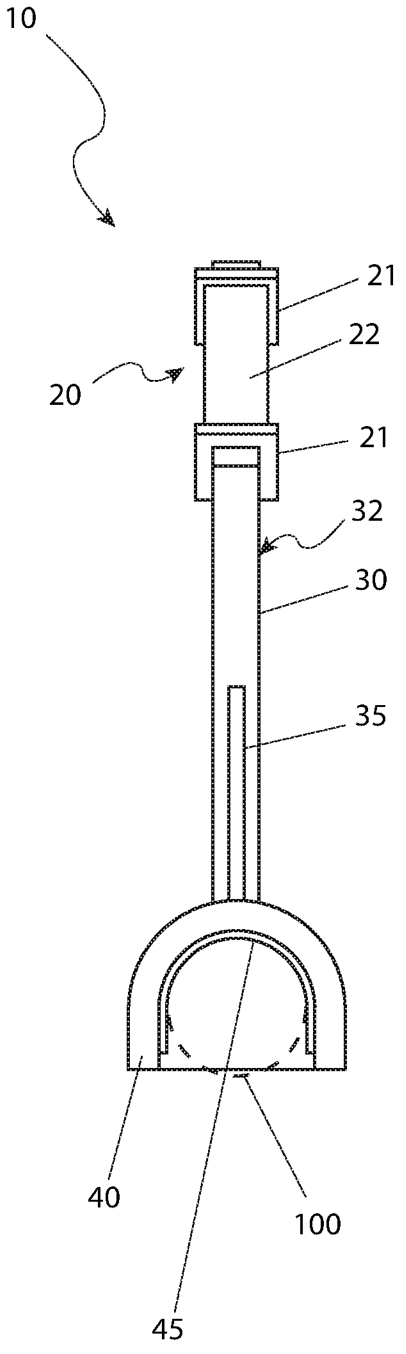
FIG. 2 is a front elevation view of the cylinder installation tool 10, according to an embodiment of the present invention; and, FIG. 3 is a side elevation view of the cylinder installation tool 10, according to an embodiment of the present invention.
Figure 3:
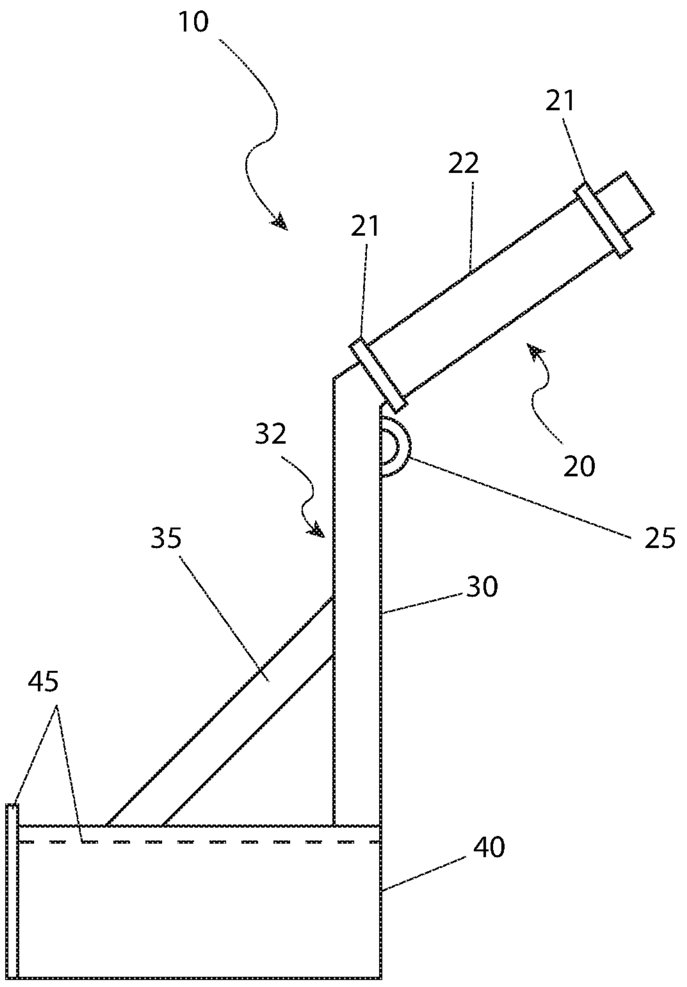

The best mode for carrying out the invention is presented in terms of its preferred embodiment, herein depicted within FIG. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a cylinder installation tool (herein described as the "apparatus") 10, which provides a tool 10 for aiding in the installation of an existing hydraulic cylinder 100 onto a unit of machinery such as, but not limited to, a backhoe, a skid steer, and the like. The apparatus 10 is to be utilized to manipulate and position the existing hydraulic cylinder 100 during installation.

Referring now to FIG. 1, a side view of the apparatus 10 depicting an in-use state according to a preferred embodiment, is disclosed. The apparatus 10 is illustrated here positioned upon a rod portion of an existing hydraulic cylinder 100 for the purpose of supporting, manipulating, and positioning the hydraulic cylinder 100 during installation onto a machine such as a backhoe or a skid steer. The apparatus 10 provides integral welded portions including an upper-section 20, a mid-section 30, and a base 40. The upper-section 20 allows a user to grasp the apparatus 10 securely using one (1) or both hands at a safe position and distance from the hydraulic cylinder 100. The base 40 provides a generally semi-cylindrical shape which emulates and conforms to a profile of the hydraulic cylinder 100. The apparatus 10 is illustrated with the base 40 being positioned along an upper surface portion of the hydraulic cylinder 100; however, it is understood that the apparatus 10 may also be positioned below or upon either side of the hydraulic cylinder 100 with equal benefit based upon a particular installation scenario, and as such should not be interpreted as a limiting factor of the apparatus 10. The apparatus 10 is to be structured and arranged to allow a user to stand in an upright condition and hold the apparatus 10 while an installer places a hydraulic cylinder in the base 40 prior to the installation. The apparatus 10 is envisioned to be made using non-distorting, ferrous materials.

Referring now to FIGS. 2 and 3, front and side views of the apparatus 10, according to a preferred embodiment are disclosed. The apparatus 10 includes welded, or otherwise affixed portions including an upper-section 20, a mid-section 30, a cross brace 35, and a base 40. The upper-section 20 is envisioned to be made using a first tubing length 23 made using structural-grade rectangular tubing. The first length 23 includes a pair of protruding shoulder portions 21 positioned at each end. A grip portion 22 spans a gap between the shoulders 21. The raised shoulders 21 may be structured and arranged to frictionally or mechanically prevent longitudinal sliding of the grip portion 22. The grip 22 is envisioned to be made using rubber or a similar material which provides a height-friction grasping surface as well as acting to dampen vibrations being conducted into a user's hands during use. The grip 22 is envisioned to be made using an oil-resistant rubber composition. The first tube length 23 and grip 22 portions are to be structured and arranged to accommodate one (1) or both of the user's hands. The first tube length 23 is fixedly-attached to the mid-section 30 at a forty-five degree (45°) angle, preferably using a welding method.

In further reference to FIGS. 2 and 3, the mid-section 30 is also made using a similar material as the upper-section 20, and includes a second tube length 32. The second tube length 32 includes a distal end being fixedly attached to the first tube length 23, and a proximal end being fixedly attach to a top end portion of the cylindrically-shaped base 40. The second tube length 32 may comprise a particular length which would enable the user to stand in an upright condition while the apparatus 10 is in use. The mid-section 30 also includes a semi-circular eyelet 25 being welded to an upper outer surface of the second tube length 32, thereby enabling the apparatus 10 to be hung upon a stationary appendage, such as a hook mounted to a wall, for convenient storage of the apparatus 10 until needed.

The mid-section 30 also includes a cross brace 35 which extends from an intermediate point on the second tube length 32 to a central location portion of the cylindrical base 40. The cross brace 35 is to be affixed to the mid-section 30 and base 40 portions preferably using a welding method. The cross brace 35 is envisioned to be affixed to the mid-section 30 and base 40 portions at approximately a forty-five degree (45°) angle. The cross brace 35 may comprise a flat or rectangular shape being structured and arranged to increase the torsional loads that may be applied to the apparatus 10.

In further reference to FIG. 2, the base 40 is envisioned to provide a downward-facing semi-cylindrical form including opposing half-circle annular end portions so as to longitudinally receive and partially encompass the rod portion of the hydraulic cylinder 100 laterally during an installation condition (see FIG. 1). The base 40 further includes a rubber sleeve 45 which covers an entire internal curved surface, being affixed thereto the base 40 using adhesives or an equivalent means. In use, the sleeve 45 provides protection from abrasion and/or scratching of the hydraulic cylinder 100. The diameter and/or height of the base 40 is to be structured and arranged to provide stability for the hydraulic cylinder 100 while the apparatus 10 is in use.

It is understood that additional models of the apparatus 10 would be made available for purchase having differently shaped based 40 so as to comply to correspondingly shaped hydraulic cylinders 100. Furthermore, an additional embodiment of the apparatus 10 is envisioned which would provide removable attachment of the base portion 40, thereby allowing installation of a plurality of different bases 40 to the mid-section 30 to accommodate hydraulic cylinders 100 of varying sizes.

It is understood that the exact specifications, materials used, and method of use of the apparatus 10 may vary upon manufacturing.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring a model of the apparatus 10 having a base 40 whose internal shape and diameter correspond to that of an intended existing hydraulic cylinder 100 to be installed; grasping the upper-section 20 of the apparatus 10 with one (1) or both hands upon the grip 22; loading an existing hydraulic cylinder 100 into the base 40 of the apparatus 10 by positioning the rubber sleeve portion 45 of the base 40 upon a rod portion of the existing hydraulic cylinder 100; manipulating and positioning the hydraulic cylinder 100 into a desired position upon a machine such as a backhoe or a skid steer; completing the installation and securement of the hydraulic cylinder 100 onto mounting feature portions of the backhoe or a skid steer; removing the apparatus 10 from the hydraulic cylinder 100; using the eyelet 25 upon the mid-section 30 to hang and store the apparatus 10 upon a stationary appendage such as a hook, until needed again; and, benefiting from a safe and secure means to manipulate and position a hydraulic cylinder 100 during installation, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cylinder installation tool, comprising:

a first tube length having a first tube length first end and a first tube length second end comprising:

a first shoulder disposed adjacent said first tube length first end; and, a second shoulder disposed adjacent said first tube length second end;

a mid-section having a mid-section first end and a mid-section second end, wherein said first tube length second end is secured to said mid-section first end;

a base having a base first end and a base second end, wherein said base first end is secured to said mid-section second end at an exterior side of said base first end; and, a cross-brace having a cross-brace first end and a cross base second end; wherein said cross-brace first end is secured to a midpoint of an exterior first side of said mid-section and said cross-brace second end is secured to a midpoint of said exterior side of said base between said base first end and said base second end;

wherein said first tube length further comprises a rubber grip disposed between said first shoulder and said second shoulder;

wherein said base comprises a half tubular shape having an interior side configured to engage an exterior surface of a hydraulic cylinder; and, wherein when a first force is applied to said first tube length said first force is transmitted to an exterior surface of said hydraulic cylinder when said hydraulic cylinder is fit about by said base thereby permitting manipulation of said hydraulic cylinder.

2. A cylinder installation tool, comprising:

a first tube length having a first tube length first end and a first tube length second end;

a mid-section having a mid-section first end and a mid-section second end, wherein said first tube length second end is secured to said mid-section first end;

a base having a base first end and a base second end, wherein said base first end is secured to said mid-section second end at an exterior side of said base first end;

a cross-brace having a cross-brace first end and a cross base second end; wherein said cross-brace first end is secured to a midpoint of an exterior first side of said mid-section and said cross-brace second end is secured to a midpoint of said exterior side of said base between said base first end and said base second end; and, an eyelet secured to a second side of said mid-section between said cross-brace and below said mid-section first end;

wherein said base comprises a half tubular shape having an interior side configured to engage an exterior surface of a hydraulic cylinder; and, wherein when a first force is applied to said first tube length said first force is transmitted to an exterior surface of said hydraulic cylinder when said hydraulic cylinder is fit about by said base thereby permitting manipulation of said hydraulic cylinder.

3. A cylinder installation tool, comprising:

a first tube length having a first tube length first end and a first tube length second end comprising:

a first shoulder disposed adjacent said first tube length first end; and, a second shoulder disposed adjacent said first tube length second end;

a mid-section having a mid-section first end and a mid-section second end, wherein said first tube length second end is secured to said mid-section first end;

a base having a base first end and a base second end, wherein said base first end is secured to said mid-section second end at an exterior side of said base first end;

a cross-brace having a cross-brace first end and a cross base second end; wherein said cross-brace first end is secured to a midpoint of an exterior first side of said mid-section and said cross-brace second end is secured to a midpoint of said exterior side of said base between said base first end and said base second end; and, an eyelet secured to a second side of said mid-section between said cross-brace and below said mid-section first end;

wherein said first tube length is secured to said mid-section at a forty-five-degree angle relative to a longitudinal axis to and away from said base;

wherein said first tube length is welded to said mid-section;

wherein said cross-brace is secured to said mid-section and said base at respective forty-five-degree angles;

wherein said cross-brace is welded to said mid-section;

wherein said cross-brace is welded to said base;

wherein said first tube length further comprises a rubber grip disposed between said first shoulder and said second shoulder;

wherein said base comprises a half tubular shape having an interior side configured to engage an exterior surface of a hydraulic cylinder;

wherein said base comprises a rubber sleeve nesting within said interior side of said base and contiguous with said interior side of said base; and, wherein when a first force is applied to said first tube length said first force is transmitted to an exterior surface of said hydraulic cylinder when said hydraulic cylinder is fit about by said base thereby permitting manipulation of said hydraulic cylinder.

* * * * *